US008718884B2

(12) United States Patent
Hou

(10) Patent No.: US 8,718,884 B2
(45) Date of Patent: May 6, 2014

(54) SYSTEM AND METHOD FOR CORRECTION OF VEHICLE SPEED LAG IN A CONTINUOUSLY VARIABLE TRANSMISSION (CVT) AND ASSOCIATED VEHICLE

(75) Inventor: Yanming Hou, Pleasant Prairie, WI (US)

(73) Assignee: CNH Industrial America LLC, New Holland, PA (US)

( * ) Notice: Subject to any disclaimer, the term of this patent is extended or adjusted under 35 U.S.C. 154(b) by 316 days.

(21) Appl. No.: 13/220,977

(22) Filed: Aug. 30, 2011

(65) Prior Publication Data

US 2013/0053215 A1 Feb. 28, 2013

(51) Int. Cl.
*B60W 10/06* (2006.01)

(52) U.S. Cl.
USPC .................... 701/55; 701/51; 701/54; 701/56; 701/104; 701/115; 477/39; 477/43; 477/110

(58) Field of Classification Search
USPC ............ 701/51, 54, 104, 115, 55, 56; 477/39, 477/43, 110
See application file for complete search history.

(56) References Cited

U.S. PATENT DOCUMENTS

| | | | | |
|---|---|---|---|---|
| 4,648,040 | A * | 3/1987 | Cornell et al. | 701/52 |
| 4,663,713 | A * | 5/1987 | Cornell et al. | 701/52 |
| 4,669,436 | A | 6/1987 | Nanjyo et al. | |
| 6,308,124 | B1 * | 10/2001 | Kresse et al. | 701/53 |
| 6,901,324 | B2 * | 5/2005 | Rose et al. | 701/54 |
| 7,146,263 | B2 * | 12/2006 | Guven et al. | 701/54 |
| 8,175,790 | B2 * | 5/2012 | Stemler et al. | 701/110 |
| 8,353,271 | B2 * | 1/2013 | Nishi et al. | 123/350 |
| 8,410,737 | B2 * | 4/2013 | Wu et al. | 318/400.11 |
| 2002/0132699 | A1 * | 9/2002 | Bellinger | 477/107 |
| 2003/0216847 | A1 * | 11/2003 | Bellinger | 701/51 |
| 2004/0002806 | A1 * | 1/2004 | Bellinger | 701/104 |
| 2005/0071066 | A1 * | 3/2005 | Rose et al. | 701/54 |
| 2005/0071067 | A1 * | 3/2005 | Guven et al. | 701/54 |
| 2007/0118266 | A1 * | 5/2007 | Hino et al. | 701/51 |
| 2009/0048053 | A1 * | 2/2009 | Ruppert et al. | 475/211 |
| 2010/0186402 | A1 * | 7/2010 | Ariga et al. | 60/329 |
| 2010/0192907 | A1 * | 8/2010 | Stemler et al. | 123/350 |
| 2010/0218493 | A1 * | 9/2010 | Nakamura et al. | 60/426 |
| 2011/0277577 | A1 * | 11/2011 | Roberge et al. | 74/473.1 |

* cited by examiner

*Primary Examiner* — John R Olszewski
*Assistant Examiner* — Truc M Do
(74) *Attorney, Agent, or Firm* — Sue C. Watson

(57) ABSTRACT

A method and associated system for compensation of vehicle speed lag resulting from changing load conditions in a continuously variable transmission (CVT) vehicle includes detecting and measuring true engine torque resulting from load changes placed on the vehicle engine. A true engine speed droop is calculated from the true engine torque. A compensated engine speed signal is generated based on the calculated true engine speed droop and is applied to the engine to produce a true engine speed that corresponds to a target engine speed at the load condition corrected for true engine speed droop.

15 Claims, 2 Drawing Sheets

SYSTEM AND METHOD FOR CORRECTION OF VEHICLE SPEED LAG IN A CONTINUOUSLY VARIABLE TRANSMISSION (CVT) AND ASSOCIATED VEHICLE

FIELD OF THE INVENTION

The field of the invention relates in general to a control aspect of a continuously variable transmission (CVT), and more particularly to a control method and system for ground speed control of a CVT vehicle.

BACKGROUND OF THE INVENTION

A continuously variable transmission (CVT) is capable of continuous drive train speed ratio changes. A vehicle utilizing a CVT operates with improved performance as compared to a conventional engine having a stepped transmission. CVT systems have become widely accepted, particularly in utility and work vehicles, such as tractors and the like, wherein vehicle speed must be matched to relatively large and varying load conditions.

One type of CVT design is a hydro-mechanical stepless drive system. It consists of a front side shuttle, compound planetary gear, and four mechanical ranges. The engine drives an input sun gear and the hydro-motor drives the ring gear as a variator. The dual outputs from the carrier and second sun gear are combined at a pinion shaft. In front of the planetary system is the shuttle arrangement with forward and reverse frictional clutches, and operatively configured after the planetary system are the four mechanical ranges shifting between the two planetary outputs. These shifts are carried out with frictional disk clutches at synchronized conditions. Thus, the requirement for electronic control is greatly simplified in this type of CVT design.

Another type of conventional CVT uses a belt or chain drive variator consisting of a belt or chain running between two variable diameter pulleys. Each pulley has a movable disc and an opposed fixed disc, with the discs defining sloped surfaces. The discs move closer or further apart to vary their respective diameters and, thus, provide an infinite number of transmission ratios ("speed ratios"). The discs are typically controlled by a pressure system (e.g., a hydraulic actuating system).

For a vehicle operating with a CVT, the vehicle speed is the product of engine speed and the CVT speed ratio, which is controlled by a CVT logic controller. When the operator sets a desired vehicle speed, the CVT logic controller calculates a corresponding engine speed and CVT speed ratio. Under most varying working conditions (e.g., varying loads and temperature changes), the difference between the desired and true CVT speed ratio can be controlled to be very close, and can be so small and stable that it is hardly noticeable in vehicle performance.

On the other hand, the difference between desired engine speed and true engine speed may be quite noticeable and constantly changing with the varying working conditions. For most operations, engine speed is controlled by a governor in accordance with a design droop line. When load (engine torque) increases, the engine speed (rpm) reduces along the droop line until the max torque curve is reached, at which point the engine speed decreases as a function of the design torque curve. As the load decreases, the engine speed recovers along the torque curve and then along the speed droop line. The engine speed is controlled at the set target value only when there is no load on the engine. Thus, engine speed will fluctuate with constantly changing vehicle working conditions under normal operations and, even though the CVT speed ratio can be closely controlled, the vehicle speed will change with the changing engine speed and deviate from the target vehicle speed ("speed lag").

In at least certain conventional CVT control logic schemes, the vehicle speed lag is compensated for by detecting the engine speed droop. The control system measures the deviation between detected engine speed and target engine speed and commands the engine speed to adjust accordingly to compensate for the deviation. However, control theory dictates that a steady, errorless, operating state cannot be reached when the measured variable is also the control variable. Also, engine speed is very sensitive to environmental changes. When the engine load changes, it takes time for engine speed to settle at a new speed along the speed droop curve. During this time, however, the CVT control logic is attempting to compensate for the load induced speed change and the situation can occur wherein the load induced speed change and the commanded speed change adjustment are opposed, resulting in a fluctuating and unstable speed governing condition.

Thus, an improved control method and corresponding system for CVT vehicle speed lag compensation is desired.

BRIEF DESCRIPTION OF THE INVENTION

Aspects and advantages of the invention will be set forth in part in the following description, or may be obvious from the description, or may be learned through practice of the invention.

In accordance with various embodiments of the present subject matter, a control method is provided for compensation of speed lag from changing load conditions in a continuously variable transmission (CVT) vehicle. The method includes detecting and measuring true engine torque that results from load changes placed on the vehicle engine. A true engine speed droop is calculated from the true engine torque, and an engine speed correction command is generated based on the calculated true engine speed droop. This correction command is applied to the target engine speed at the load condition to generate a compensated engine speed signal supplied to the engine.

The true engine torque may be variously detected and measured. For example, engine torque signals are readily available to almost all types of conventional CVT control systems, and any one or combination of these sources may be utilized. In one embodiment, the true engine torque is directly detected and measured at a drive train component of the CVT, for example at the engine output drive shaft, or the CVT input drive shaft. In other embodiments, the true engine torque is indirectly detected and measured from an engine parameter that reflects changes in engine load, such as the CVT hydraulic pressure.

Engine droop rate, engine rated rpm, and engine rated torque are known fixed values for virtually all engine types and, in particular embodiments of the present control method, the true engine droop is calculated as follows:

$$(\text{engine droop at rated rpm})=(\text{engine droop rate})\times(\text{engine rated rpm})$$

$$(\text{true engine droop}/\text{true engine torque})=(\text{engine droop at rated rpm}/\text{engine rated torque})$$

$$(\text{true engine droop})=(\text{true engine torque})\times(\text{engine droop at rated rpm}/\text{engine rated torque})$$

(true engine droop)=(true engine torque)×[(engine droop rate)×(engine rated rpm)]/(engine rated torque)

The calculated true engine droop is then used to compute the compensated engine speed signal.

For various operational considerations, it may be desired to filter the true engine torque value in accordance with any combination of defined filter parameters to dampen the engine speed compensation command in any one or combination of magnitude, rate, and timing so as to decrease the likelihood of over-compensation conditions that could potentially lead to unstable engine operation. For example, the measured true engine torque values may be filtered to eliminate transient engine load changes within a defined time period, or to eliminate minor engine load changes that are below a defined value.

The present invention also encompasses any manner of vehicle, including working vehicles such as tractors and the like, that incorporates the control methodology disclosed herein. For example, a continuously variable transmission (CVT) vehicle may be provided with a control system for compensation of speed lag resulting from changing load conditions placed on the vehicle. Such a vehicle includes an engine and a drive train coupled to the engine, with the drive train further including a CVT. A sensor is operably configured along the drive train to detect and measure true engine torque resulting from load changes placed on the engine. A control system is in operable communication with the sensor and is programmed to calculate a true engine speed droop from the true engine torque, generate an engine speed compensation command based on the calculated true engine speed droop, and apply the engine speed compensation command to the engine (e.g., via an engine control circuit/function, logic, or other type of control mechanism) to produce a true engine speed corresponding to a target engine speed at the load condition plus the engine speed compensation command.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
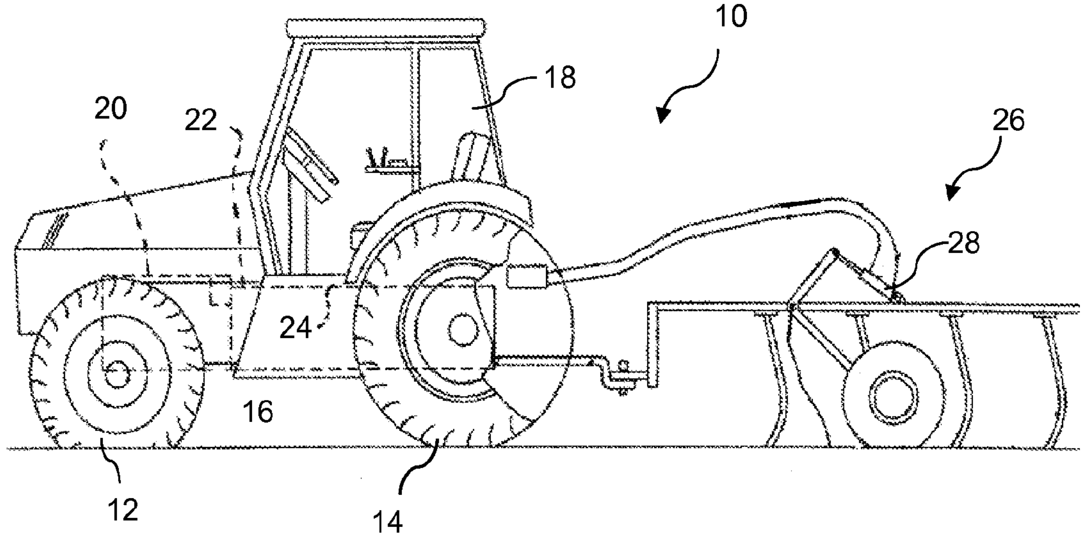
FIG. 1 is a perspective view of a vehicle, in particular a tractor, that incorporates a CVT control system in accordance with aspects of the invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations that come within the scope of the appended claims and their equivalents.

As mentioned, various embodiments of the present subject matter relate to a control method and system for compensation of speed lag from changing load conditions in a continuously variable transmission (CVT) vehicle. FIG. 1 illustrates an exemplary CVT vehicle 10, which may be an agricultural tractor or similar work vehicle. The vehicle 10 includes a pair of front wheels 12, a pair or rear wheels 14, a chassis 16, and an operator's cab 18. The vehicle 10 is operably coupled to a work implement 26 by any manner of conventional positioning hitch 28. The rear wheels 14 are driven by an engine 20. A CVT transmission 22 is operably coupled to the engine 20 and provides variably adjusted gear ratios for transferring engine power to the wheels 14 (and/or implement 26) via a differential 24. The engine 20, CVT transmission 22, and differential 24 collectively define the chassis 16.

In an alternate embodiment, a separate frame or chassis may be provided to which the engine 20, transmission 22, and differential 24 are coupled, a configuration common in smaller tractors. Still other tractor configurations may drive all wheels on the tractor, use an articulated chassis to steer the tractor, or rely on tracks in lieu of wheels. It should be appreciated that the CVT control system and method of the present invention are readily adaptable to any manner of tractor or work vehicle configuration.

It should also be understood that the present invention is not limited to any particular type of CVT. The CVT control systems and methods may be implemented with any type of CVT in which the input/output gear ratios are variably controlled, including hydrostatic and friction CVTs. For example, the CVT design may be a hydro-mechanical stepless drive system consisting of a front side shuttle, compound planetary gear, and four mechanical ranges, wherein the engine drives an input sun gear and the hydro-motor drives the ring gear as a variator and the dual outputs from the carrier and second sun gear are combined at a pinion shaft. In front of the planetary system is the shuttle arrangement with forward and reverse frictional clutches, and operatively configured after the planetary system are the four mechanical ranges shifting between the two planetary outputs via frictional disk clutches at synchronized conditions. In another embodiment (FIG. 2), the CVT 22 may include a belt or chain-type transmission (often referred to as a "variator") wherein a belt or chain 32 is wrapped around primary and secondary pulley pairs 30, 31. The pulley pairs 30, 31 include a fixed conical plate and a movable conical plate that define respective V-shaped grooves. A hydraulic system moves the movable plates in the axial direction to vary the width of the V-grooves and, thus, corresponding gear ratio of the transmission.

The present method and control system embodiments include detecting and measuring true engine torque that results from load changes placed on the vehicle engine 20, for example from changes in the soil conditions experienced by the work implement 26, terrain changes, and so forth. The true engine torque is used to generate a compensated engine speed signal to account for load-induced vehicle speed lag.

Figure 3:
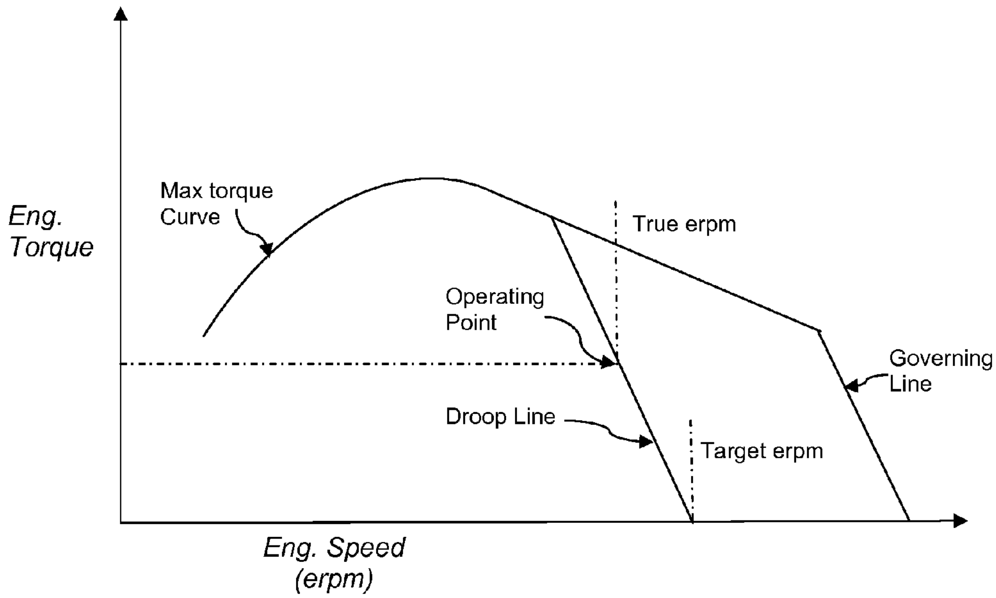
FIG. 3 is a graph of engine torque versus engine speed that depicts particular operational principles in accordance with aspects of the invention.

Referring to FIG. 3, CVT vehicles typically employ electronic governing engines that are controlled by a governor droop line. For typical engines, the droop line starts at the commanded (target) engine speed and ends at the max torque curve. The droop line is essentially parallel to the engine governing line. When the load (engine torque) increases, the engine speed (engine rpm or "erpm") will "droop" along the droop line until the max torque curve is reached, at which point the engine speed droops along the torque curve. As the load decreases, the engine speed recovers along the torque curve and then along the droop line.

As can be seen in FIG. 3, the engine speed is at the target speed only when there is no load on the engine. Vehicle working conditions (load) constantly change during normal operations and the true engine speed at a given operating point will fluctuate along the droop line with the changing loads. The higher the load, the greater is the true engine speed from the target engine speed, as well as the magnitude of the vehicle speed lag. The present control system and methodologies recognize that, theoretically, engine torque is the primary factor causing engine speed droop and is a much more stable and useful signal in a speed lag compensation control logic.

Figure 2:
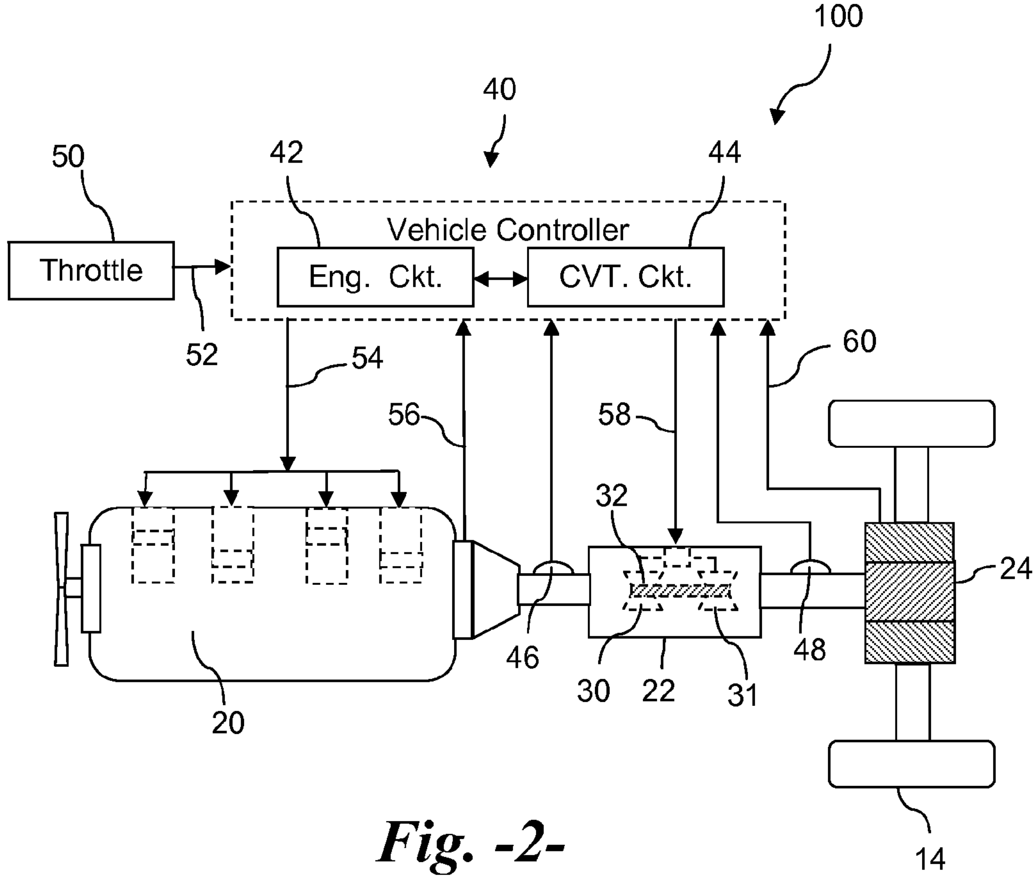
FIG. 2 is a block diagram view of an embodiment of a CVT vehicle control system.

Referring to FIG. 2, an embodiment of a CVT vehicle control system 100 is depicted with a vehicle controller 40 that may include an engine control logic 42 and a CVT control logic 44, which are typically standalone logic. The controller 40 receives a target speed signal 52 from an operator of the vehicle. This target speed signal may be from a throttle mechanism 50, for example as a function of a throttle lever or pedal position, a throttle valve opening, and so forth. From the target speed signal 52, the controller 40 calculates a target engine speed signal 54 that is sent to the engine 20 and a CVT output/input ratio signal 58 for the CVT 22. The CVT 22 converts the engine power at the commanded ratio to the vehicle drive (wheels 14 and/or implement 26) via the differential 24, resulting in a true vehicle speed signal 60 transmitted to the controller 40.

Still referring to FIG. 2, the external loads (vehicle and/or implements) generate an axle load transmitted to the CVT 22, which may be sensed by a torque sensor 48 and transmitted to the controller 40. The CVT load is transferred to the engine (engine load), which causes the true engine speed (true erpm in FIG. 3) to droop along the droop line and transmitted to the controller 40 as a true engine speed signal 56, as discussed above with respect to FIG. 3. This deviation between target engine speed and true engine speed results in actual vehicle ground speed deviating from target ground speed (vehicle speed lag). The engine load may be sensed by an appropriately located torque sensor 46 and transmitted to the controller 40.

Figure 4:
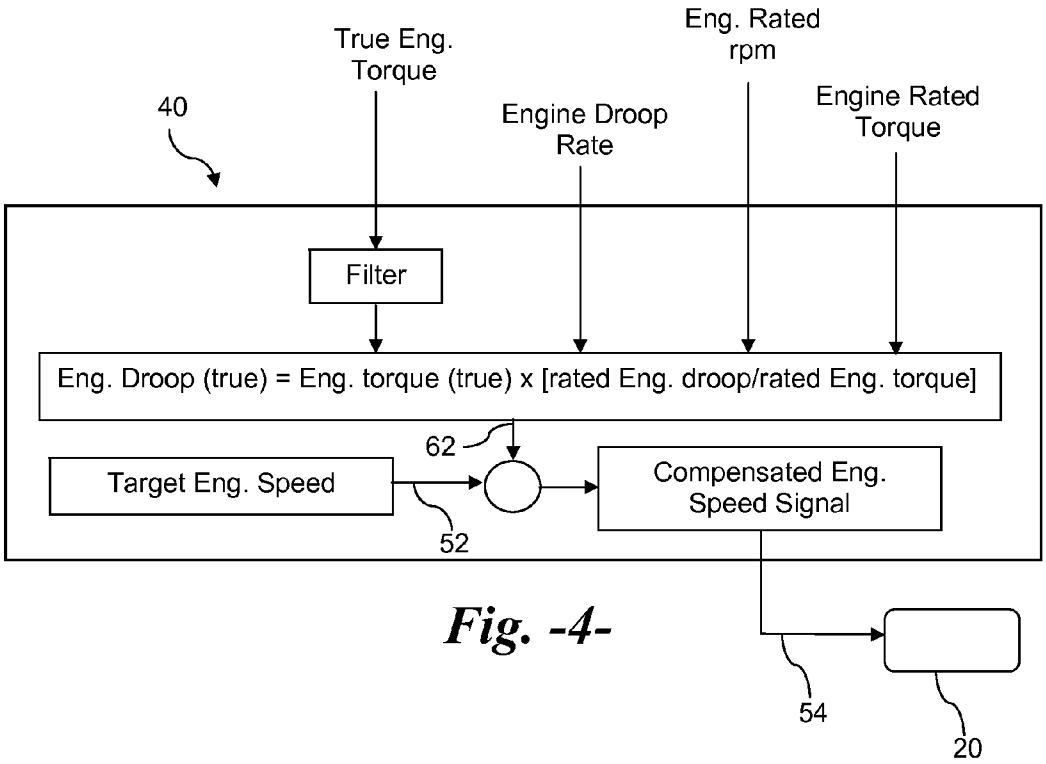
FIG. 4 is a block diagram of the logic control of an embodiment of a CVT control system.

Referring to the logic control diagram of FIG. 4 for the controller 40, a true engine speed droop is calculated from the true engine torque, and an engine speed correction command 62 is generated based on the calculated true engine speed droop. A compensated engine speed signal 54 is applied to the engine to produce a true engine speed that corresponds to the target engine speed 52 (FIGS. 2 and 3) at the load condition plus the engine speed correction 62.

True engine torque is a direct reflection of vehicle load and is less sensitive to noise and disturbances as compared, for example to engine speed. True engine torque may be variously detected and measured. For example, the engine torque signal may be supplied by the sensor 46 discussed above with respect to FIG. 2, or a sensor operably configured with a drive train component that changes a measurable parameter based on load conditions. For example, true engine torque may be correlated to the transmission load detected by sensor 48 in FIG. 2. In an alternate embodiment, the true engine torque may be indirectly detected and measured from an engine parameter that reflects changes in engine load. For example, a sensor that detects changes in the CVT hydraulic pressure may provide a signal that is proportional to true engine load.

Referring again to FIG. 4, engine droop rate, engine rated rpm, and engine rated torque are known, fixed values for the engine and provided as fixed input values to the controller 40. With these values, the true engine droop may be calculated as follows:

(engine droop at rated rpm)=(engine droop rate)×(engine rated rpm)

(true engine droop/true engine torque)=(engine droop at rated rpm/engine rated torque)

(true engine droop)=(true engine torque)×(engine droop at rated rpm/engine rated torque)

(true engine droop)=(true engine torque)×[(engine droop rate)×(engine rated rpm)]/(engine rated torque).

The calculated true engine droop is used as the correction signal 62 that is added to the target engine speed 52 to compute the compensated engine speed sent to the engine 20.

As indicated in FIG. 4, for various operational considerations, it may be desired to filter the true engine torque value in accordance with any combination of defined filter parameters. For example, when the vehicle accelerates in response to the compensated target engine speed signal, dynamic torque may be generated and sensed as increased engine load that correspondingly increases the correction signal and may lead to an unstable feedback situation. Filtration may be applied to the torque signal to eliminate this dynamic torque effect. For example, filtration may be applied to dampen the compensated engine speed signal in any one or combination of magnitude, rate, and timing so as to decrease the likelihood of an over-compensation condition. The measured true engine torque values may be filtered to eliminate relatively short-lived transient engine load changes, or to eliminate minor engine load changes that are below a defined value.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for compensation of speed lag from changing load conditions in a continuously variable transmission (CVT) vehicle, comprising;

detecting and measuring true engine torque resulting from load changes placed on the vehicle engine;

calculating a true engine speed droop from the true engine torque, wherein engine droop rate, engine rated rpm, and engine rated torque are known fixed values, the true engine droop calculated as follows:

(engine droop at rated rpm)=(engine droop rate)×(engine rated rpm)

(true engine droop/true engine torque)=(engine droop at rated rpm/engine rated torque)

(true engine droop)=(true engine torque)×(engine droop at rated rpm/engine rated torque)

(true engine droop)=(true engine torque)×[(engine droop rate)×(engine rated rpm)]/(engine rated torque);

generating a compensated engine speed signal based on the calculated true engine speed droop; and applying the compensated engine speed signal to the engine to produce a true engine speed corresponding to a target engine speed at the load condition corrected for true engine speed droop.

2. The method of claim 1, wherein true engine torque is directly detected and measured at a drive train component of the CVT.

3. The method of claim 2, wherein true engine torque is detected and measured at the engine output drive shaft.

4. The method of claim 2, wherein true engine torque is detected and measured at the CVT output drive shaft.

5. The method of claim 1, wherein true engine torque is indirectly detected and measured from an engine parameter that reflects changes in engine load.

6. The method of claim 1, further comprising filtering the true engine torque values in accordance with defined filter parameters to modify the compensated engine speed signal in any one or combination of magnitude, rate, and timing to decrease over-compensation conditions.

7. The method of claim 6, wherein the measured true engine torque values are filtered to eliminate transient engine load changes within a defined time period.

8. The method of claim 6, wherein the measured true engine torque values are filtered to eliminate minimal engine load changes below a defined value.

9. A continuously variable transmission (CVT) vehicle having a control system for compensation of speed lag resulting from changing load conditions placed on the vehicle, said vehicle comprising:

an engine;

a drive train coupled to said engine, said drive train further comprising a CVT;

a sensor operably configured along said drive train to detect and measure true engine torque resulting from load changes placed on said engine; and a control system in operable communication with said sensor and programmed to calculate a true engine speed droop from the true engine torque, generate a compensated engine speed signal based on the calculated true engine speed droop, and apply the compensated engine speed signal to said engine to produce a true engine speed corresponding to a target engine speed at the load condition corrected for true engine speed droop, wherein engine droop rate, engine rated rpm, and engine rated torque are known fixed values for said controller, said controller configured to calculate true engine droop as follows:

(engine droop at rated rpm)=(engine droop rate)×(engine rated rpm)

(true engine droop/true engine torque)=(engine droop at rated rpm/engine rated torque)

(true engine droop)=(true engine torque)×(engine droop at rated rpm/engine rated torque)

(true engine droop)=(true engine torque)×[(engine droop rate)×(engine rated rpm)]/(engine rated torque).

10. The vehicle of claim 9, wherein said sensor is disposed so as to directly detect and measure true engine torque from a component of said drive train.

11. The vehicle of claim 9, wherein said sensor is disposed at an output drive shaft of said engine.

12. The vehicle of claim 9, wherein said sensor is disposed at an output drive shaft of said CVT.

13. The vehicle of claim 9, wherein said sensor is disposed so as to indirectly detect and measure the true engine torque from an engine parameter that reflects changes in engine load.

14. The vehicle of claim 9, wherein said controller is further configured to filter the measured true engine torque values in accordance with defined filter parameters to modify the compensated engine speed signal in any one or combination of magnitude, rate, and timing to decrease over-compensation conditions.

15. The vehicle of claim 13, wherein said controller is configured to eliminate transient engine load changes within a defined time period.

* * * * *